United States Patent
Ormsub et al.

(10) Patent No.: US 9,961,603 B2
(45) Date of Patent: May 1, 2018

(54) RADIO BASE STATION

(71) Applicant: NTT DOCOMO, INC., Tokyo (JP)

(72) Inventors: Soulisak Ormsub, Tokyo (JP); Wuri Andarmawanti Hapsari, Tokyo (JP); Takahiro Takiguchi, Tokyo (JP); Kengo Yagyu, Tokyo (JP); Hiroyuki Atarashi, Tokyo (JP); Sadayuki Abeta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 61 days.

(21) Appl. No.: 14/914,670

(22) PCT Filed: Aug. 28, 2014

(86) PCT No.: PCT/JP2014/072589
§ 371 (c)(1),
(2) Date: Feb. 26, 2016

(87) PCT Pub. No.: WO2015/030119
PCT Pub. Date: Mar. 5, 2015

(65) Prior Publication Data
US 2016/0212671 A1    Jul. 21, 2016

(30) Foreign Application Priority Data

Aug. 30, 2013 (JP) .................. 2013-180433

(51) Int. Cl.
*H04W 36/22* (2009.01)
*H04W 36/30* (2009.01)
(Continued)

(52) U.S. Cl.
CPC ............. *H04W 36/22* (2013.01); *H04L 5/001* (2013.01); *H04L 5/006* (2013.01); *H04W 16/32* (2013.01); *H04W 36/30* (2013.01); *H04W 76/025* (2013.01)

(58) Field of Classification Search
CPC ........ H04L 5/001; H04L 5/006; H04W 16/32; H04W 36/22; H04W 36/30; H04W 76/025
See application file for complete search history.

(56) References Cited

U.S. PATENT DOCUMENTS

| 8,346,275 B2 * | 1/2013 | Ogura .................. H04W 28/16 370/229 |
| 8,406,197 B2 * | 3/2013 | Lai ....................... H04W 48/20 370/235 |

(Continued)

FOREIGN PATENT DOCUMENTS

WO      2011099634 A1    8/2011

OTHER PUBLICATIONS

3GPP TSG-RAN WG2 #82 R2-131627, May 20-24, 2013, Fukuoka, Japan, pp. 1-15.*

(Continued)

*Primary Examiner* — Ahmed Elallam
(74) *Attorney, Agent, or Firm* — Osha Liang LLP

(57) ABSTRACT

An object is to improve the throughput of a mobile station UE without affecting the coverage of a macrocell in a case where CA is introduced to a HetNet environment. A radio base station eNB according to the present invention is configured to determine whether or not to change the connection destination of a mobile station UE from a small cell #1 to a small cell #2 while the mobile station UE is performing CA by using the macrocell and the small cell #1, based on at least one of the congestion status in each of the small cell #1 and the small cell #2 and the communication quality in each of the small cell #1 and the small cell #2.

12 Claims, 3 Drawing Sheets

(51) Int. Cl.
*H04W 16/32* (2009.01)
*H04L 5/00* (2006.01)
*H04W 76/02* (2009.01)

(56) References Cited

U.S. PATENT DOCUMENTS

| | | | | |
|---|---|---|---|---|
| 9,014,004 | B2* | 4/2015 | Nuss | H04W 28/08 370/236 |
| 9,060,328 | B2* | 6/2015 | Marinier | H04W 36/22 |
| 9,078,176 | B2* | 7/2015 | Song | H04W 36/0055 |
| 9,226,180 | B2* | 12/2015 | Chandrasekhar | H04W 24/02 |
| 9,661,610 | B2* | 5/2017 | Jung | H04W 72/02 |
| 9,838,908 | B2* | 12/2017 | Yasukawa | H04W 28/08 |
| 2011/0250891 | A1 | 10/2011 | Zou et al. | |
| 2012/0263145 | A1* | 10/2012 | Marinier | H04W 36/22 370/331 |
| 2013/0022026 | A1 | 1/2013 | Ishii et al. | |
| 2014/0155081 | A1* | 6/2014 | Nuss | H04W 28/08 455/453 |
| 2014/0235259 | A1* | 8/2014 | Salami | H04W 52/244 455/452.1 |
| 2014/0274195 | A1* | 9/2014 | Singh | H04W 52/241 455/522 |
| 2015/0045024 | A1* | 2/2015 | Lunden | H04W 48/16 455/434 |
| 2015/0207596 | A1* | 7/2015 | Kroener | H04W 16/08 370/329 |
| 2015/0341839 | A1* | 11/2015 | Kim | H04W 36/22 370/331 |
| 2016/0050598 | A1* | 2/2016 | Dalsgaard | H04W 36/0055 370/331 |

OTHER PUBLICATIONS

International Search Report issued in corresponding application No. PCT/JP2014/072589 dated Nov. 11, 2014 (3 pages).
Written Opinion of the International Searching Authority issued in corresponding application No. PCT/JP2014/072589 dated Nov. 11, 2014 (4 pages).
Catt, "RRM related issues of Dual Connectivity technique"; 3GPP TSG RAN WG2 Meeting #81bis, R2-130978; Chicago, USA, Apr. 15-19, 2013 (4 pages).
Fujitsu, "Discussion on master-slave RLCs"; 3GPP TSG-RAN WG2 Meeting #83, R2-132501; Barcelona, Spain, Aug. 19-23, 2013 (4 pages).
3GPP TS 36.300 V11.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (207 pages).
3GPP TS 36.331 V11.2.0, "3rd Generation Partnership Project; Technical Specification Group Radio Access Network; Evolved Universal Terrestrial Radio Access (E-UTRA); Radio Resource Control (RRC); Protocol specification (Release 11)"; Dec. 2012 (340 pages).
3GPP TS 32.522 V11.6.1, "3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)"; Jun. 2013 (57 pages).
Office Action issued in corresponding Japanese Patent Application No. 2013-180433, dated Oct. 3, 2017 (9 pages).
Extended European Search Report issued in the counterpart European Patent Application No. 14839107.1, dated Apr. 12, 2017 (11 pages).
NTT Docomo; "Views on Load Balancing and Enhanced Interference Coordination for SCE"; 3GPP TSG RAN WG1 Meeting #72bis, R1-131670; Chicago, USA, Apr. 15-19, 2013 (6 pages).
ZTE Corporation; "Mobility Enhancment for Small Cell"; 3GPP TSG-RAN2 Meeting #81, Tdoc R2-130135; St. Julian's, Malta, Jan. 28-Feb. 1, 2013 (8 pages).

* cited by examiner

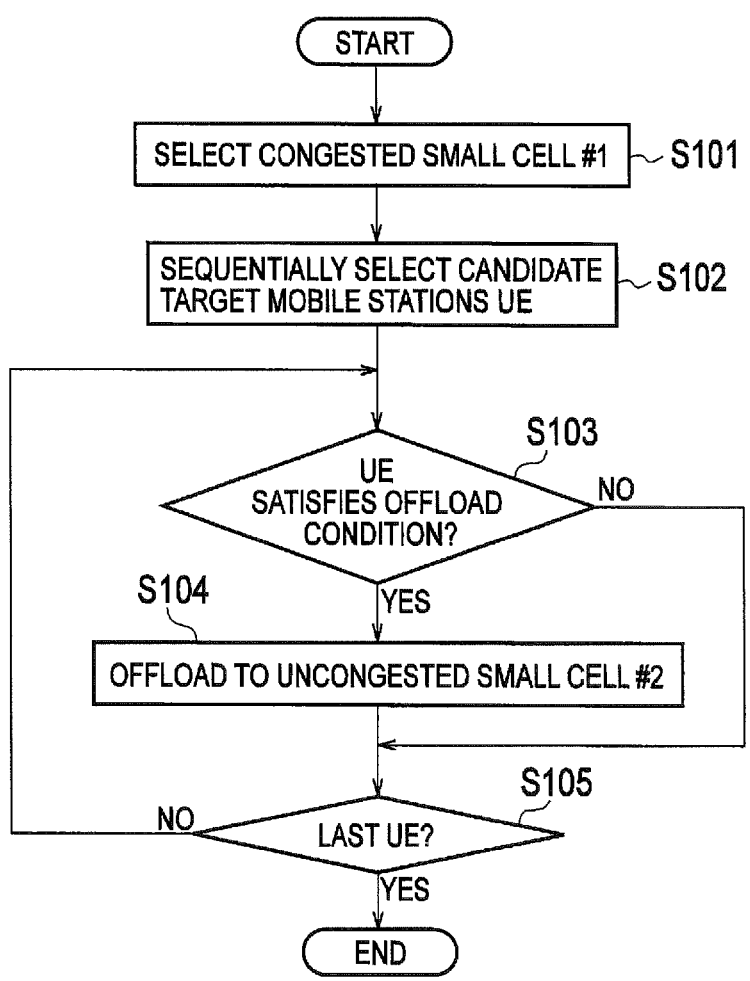

RADIO BASE STATION

TECHNICAL FIELD

The present invention relates to a radio base station.

BACKGROUND ART

In 3GPP, standardization of LTE (Long Term Evolution)-A (Advanced) as a method to expand LTE has been in progress.

CA (Carrier Aggregation) has been introduced to LTE-A to further increase the communication rate.

Here, CA is a technique to improve the peak rate and throughput of a mobile station UE and is implemented by performing communication with two or more CCs (Component Carriers).

Meanwhile, MLB (Mobility Load Balancing) is a technique specified in LTE Release-9 in 3GPP.

MLB specified in LTE Release-9 is a technique which involves, in an environment where only macrocells are present, adjusting mobility-related parameters by taking into consideration the loads on neighboring cells (macrocells). For example, by using MLB, a radio base station eNB#1 that manages a cell #1 and a radio base station eNB#2 that manages a cell #2 exchange load information therebetween while a mobile station UE is in a connected state in the cell #1, and adjust handover-related parameters (e.g. CIO, Hysteresis, etc.) to promote handover of the mobile station UE from the cell #1 to the cell #2, if the load on the cell #2 is found to be less than the load on the cell #1.

PRIOR ART DOCUMENT

Non-Patent Documents

Non-patent document 1: 3GPP TS36.300 V11.4.0 (December, 2012)
Non-patent document 2: 3GPP TS36.331 V11.2.0 (December, 2012)
Non-patent document 3: 3GPP TS32.522 V11.6.1 (June, 2013)

SUMMARY OF THE INVENTION

In LTE-A, CA is applicable not only to an environment where only macrocells are present but also to a HetNet environment (i.e. an environment where both macrocells and small cells are present.

Introducing CA can improve the throughput of a mobile station UE particularly in a HetNet environment. However, there is a possibility that traffic (load) may become uneven between small cells.

For this reason, even with CA introduced, a mobile station UE may possibly suffer a decrease in throughput in a congested small cell.

Here, MLB specified in LTE Release-9 affects the coverage of macrocells and therefore has a problem in that a coverage hole may be formed depending on how the handover-related parameters are adjusted.

Also, MLB specified in LTE Release-9 is not based on the assumption of the presence of small cells and therefore has a problem in that it may not effectively function in a HetNet environment.

Thus, the present invention has been made in view of the above problems, and an object thereof is to provide a radio base station capable of improving the throughput of a mobile station UE without affecting the coverage of a macrocell in a case where CA is introduced to a HetNet environment.

A first feature of the present invention is summarized as a radio base station configured to manage a macrocell, a first small cell, and a second small cell, including a determination unit configured to determine whether or not to change a connection destination of a mobile station from the first small cell to the second small cell while the mobile station is performing carrier aggregation by using the macrocell and the first small cell, based on at least one of a congestion status in each of the first small cell and the second small cell and a communication quality in each of the first small cell and the second small cell.

BRIEF DESCRIPTION OF THE DRAWINGS

FIG. 4 is a flowchart showing one example of the operation of the radio base station eNB according to the first embodiment of the present invention.

DETAILED DESCRIPTION (Mobile Communication System According to First Embodiment of Present Invention)

A mobile communication system according to a first embodiment of the present invention will be described with reference to FIGS. 1 to 4.

The mobile communication system according to this embodiment is an LTE mobile communication system. As shown in Parts (a) and (b) of FIG. 1, in the mobile communication system according to this embodiment, a small cell #1 and a small cell #2 are deployed adjacent to each other within a macrocell.

Here, in the mobile communication system according to this embodiment, the macrocell, the small cell #1, and the small cell #2 are managed by the same radio base station eNB.

Also, in the mobile communication system according to this embodiment, the macrocell is set as a Pcell for mobile stations UE whereas the small cells #1, #2 are set as Scells for the mobile stations UE.

Note that in the mobile communication system according to this embodiment, the radio base station eNB that manages the macrocell may be referred as a master radio base station MeNB (Master-eNB) or a macrocell radio base station MeNB (Macro-eNB).

In the mobile communication system according to this embodiment, the mobile stations UE are configured to be capable of performing CA by using the macrocell and the small cell #1 (or the small cell #2). In other words, the mobile stations UE are configured to be capable of performing the CA by using CCs in the macrocell, the small cell #1, and the small cell #2.

Figure 2:
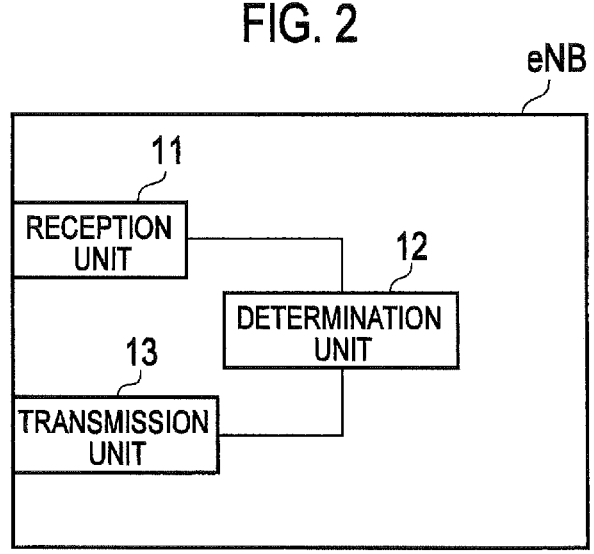
FIG. 2 is a functional block diagram of a radio base station eNB according to the first embodiment of the present invention.

As shown in FIG. 2, the radio base station eNB includes a reception unit 11, a determination unit 12, and a transmission unit 13.

The reception unit 11 is configured to receive various signals from mobile stations UE and the radio base station eNB that manage the small cells. The transmission unit 13 is configured to transmit various signals to mobile stations UE and the radio base station eNB that manage the small cells.

The determination unit 12 is configured to determine whether or not to change the connection destinations of mobile stations UE from the small cell #1 to the small cell #2 while the mobile stations UE are performing CA by using the macrocell and the small cell #1.

Here, specifically, the determination unit 12 is configured to determine whether or not to change the connection destinations of mobile stations UE from the small cell #1 to the small cell #2 based on at least one of the congestion status in each of the small cell #1 and the small cell #2 and the communication quality in each of the small cell #1 and the small cell #2.

Figure 1:
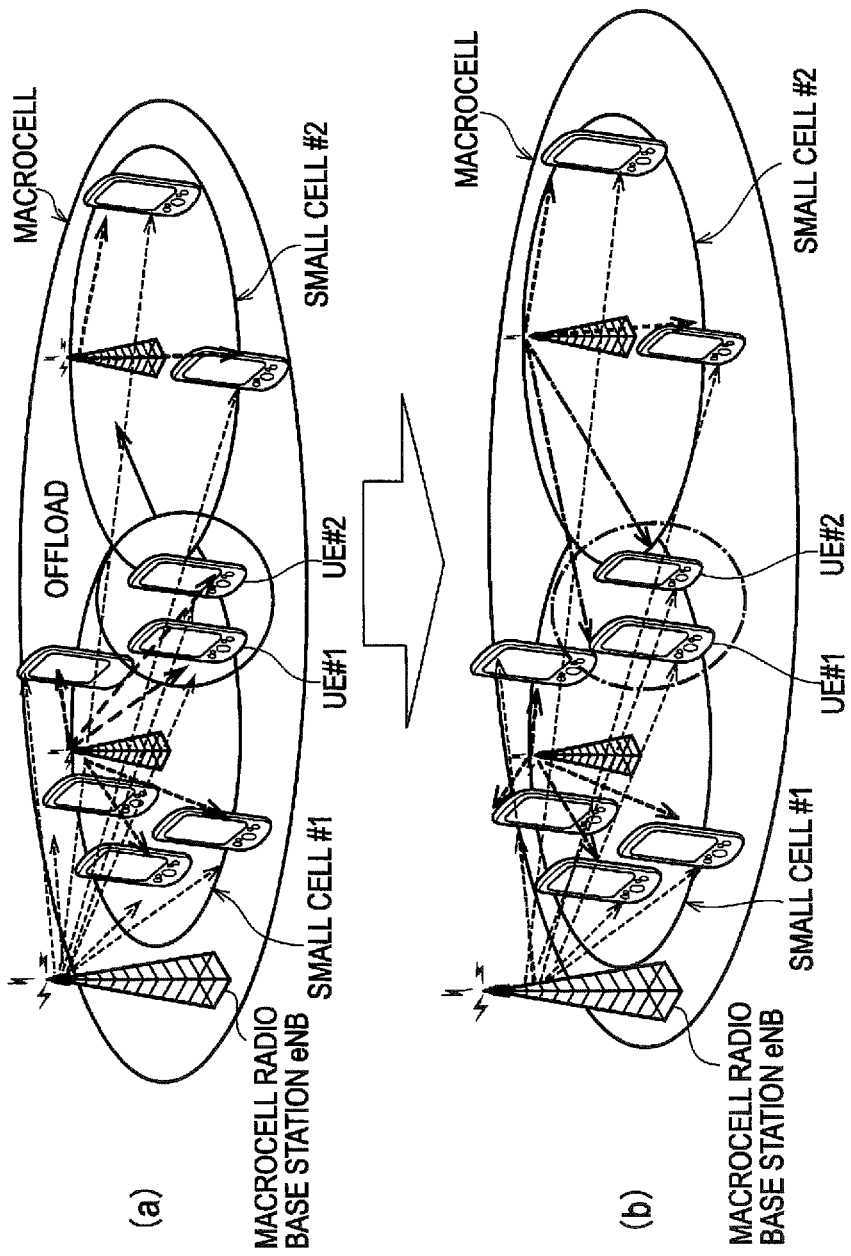
FIG. 1 is an overall configurational view of a mobile communication system according to a first embodiment of the present invention.

For example, the determination unit 12 may be configured to determine to change (offload) the connection destinations of mobile stations UE#1, UE#2 (target mobile stations UE) from the small cell #1 to the small cell #2 as shown in Part (b) of FIG. 1 in a case where an offload condition is satisfied in the small cells #1, #2 while the mobile stations UE#1, UE#2 are performing CA by using the macrocell and the small cell #1 as shown in Part (a) of FIG. 1.

On the other hand, the determination unit 12 may be configured to determine not to change the connection destinations of the mobile stations UE#1, UE#2 (target mobile stations UE) from the small cell #1 to the small cell #2 as shown in Part (b) of FIG. 1 in a case where the offload condition is not satisfied in the small cells #1, #2 while the mobile stations UE#1, UE#2 are performing CA by using the macrocell and the small cell #1 as shown in Part (a) of FIG. 1.

Also, the determination unit 12 may be configured to determine not to change the connection destinations of mobile stations other than the mobile stations UE#1, UE#2 (target mobile stations UE) from the small cell #1 to the small cell #2 as shown in Part (b) of FIG. 1 even in a case where the offload condition is satisfied in the small cells #1, #2 while the mobile stations UE#1, UE#2 are performing CA by using the macrocell and the small cell #1 as shown in Part (a) of FIG. 1.

Here, the determination unit 12 may be configured to use the number of connected mobile stations in each of the small cell #1 and the small cell #2 as the congestion status in each of the small cell #1 and the small cell #2.

In that case, the determination unit 12 may be configured to determine that the offload condition is satisfied in the small cells #1, #2 in a case where the number of connected mobile stations in the small cell #1 is greater than a predetermined threshold and the number of connected mobile stations is less than the predetermined threshold, and determine to change the connection destinations of the mobile stations UE from the small cell #1 to the small cell #2.

As the predetermined threshold, the average of the numbers of connected mobile stations in a predetermined number of small cells deployed within the macrocell may be used, for example.

Also, the determination unit 12 may be configured to determine to change the connection destinations of the mobile stations UE from the small cell #1 to the small cell #2 in a case where the number of connected mobile stations in the small cell #1 is greater than the number of connected mobile stations in the small cell #2.

Here, the determination unit 12 may be configured to determine to change the connection destinations of the mobile stations UE from the small cell #1 to the small cell #2 in a case where the number of connected mobile stations in the small cell #1 is greater than the number of connected mobile stations in the small cell #2 by the predetermined threshold.

Alternatively, the determination unit 12 may be configured to use the amount of traffic in each of the small cell #1 and the small cell #2 as the congestion status in each of the small cell #1 and the small cell #2.

In that case, the determination unit 12 may be configured to determine that the offload condition is satisfied in the small cells #1, #2 in a case where the amount of traffic in the small cell #1 is greater than a predetermined threshold and the amount of traffic in the small cell #2 is less than the predetermined threshold, and determine to change the connection destinations of the mobile stations UE from the small cell #1 to the small cell #2.

Also, the determination unit 12 may be configured to determine to change the connection destinations of the mobile stations UE from the small cell #1 to the small cell #2 in a case where the amount of traffic in the small cell #1 is greater than the amount of traffic in the small cell #2 by the predetermined threshold.

As the predetermined threshold, the average of the amounts of traffic in a predetermined number of small cells deployed within the macrocell may be used, for example.

Here, the determination unit 12 may be configured to determine to change the connection destinations of the mobile stations UE from the small cell #1 to the small cell #2 in a case where the offload condition based on the number of connected mobile stations and the offload condition based on the amount of traffic are both satisfied.

Also, the determination unit 12 may be configured to determine a mobile station UE as a target mobile station UE (i.e. determine that the mobile station UE satisfy the offload condition) in a case where the difference between the communication quality of the mobile station UE in the small cell #1 and the communication quality of the mobile station UE in the small cell #2 is less than or equal to a predetermined threshold (e.g. x dB), and determine whether or not to change the connection destination of the mobile station UE from the small cell #1 to the small cell #2.

Alternatively, the determination unit 12 may be configured to determine whether or not to change the connection destination of a mobile station UE from the small cell #1 to the small cell #2 in a case where the communication quality of the mobile station UE in the small cell #1 is lower than a predetermined communication quality and the communication quality of the mobile station UE in the small cell #2 is higher than the predetermined communication quality.

Here, the determination unit 12 may be configured to use any one of RSRP (Reference Signal Received Power), RSRQ (Reference Signal Received Quality), SIR (Signal to Interference Ratio), and CQI (Channel Quality Indicator) in each of the small cell #1 and the small cell #2 as the communication quality in each of the small cell #1 and the small cell #2.

Note that the determination unit 12 may be configured to use a communication quality reported by report information (e.g. Measurement Report) from the mobile station UE as the communication quality.

The operation of the mobile communication system according to this embodiment will be described below with reference to FIGS. 3 and 4.

Firstly, one example of the operation of the mobile communication system according to this embodiment will be described with reference to FIG. 3.

Figure 3:
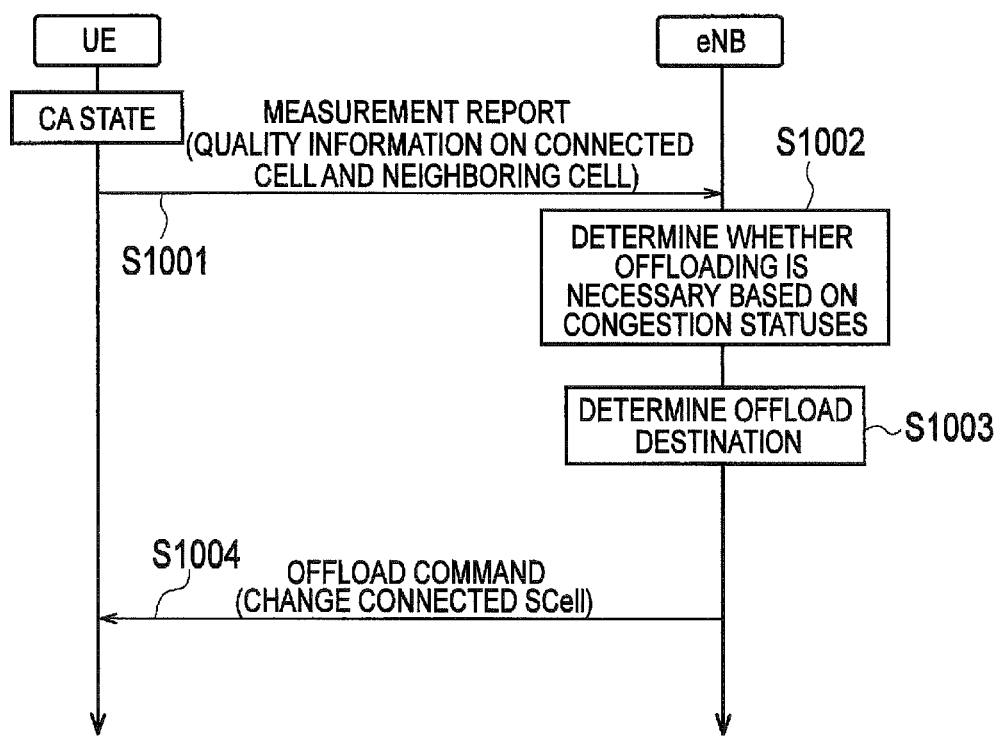
FIG. 3 is a sequence chart showing one example of the operation of the mobile communication system according to the first embodiment of the present invention.

As shown in FIG. 3, in step S1001, a mobile station UE performing CA by using the macrocell and the small cell #1 transmits a "Measurement Report" containing quality information indicating the communication quality in each of the small cell #1 (currently-connected cell) and the small cell #2 (neighboring cell) to the radio base station eNB that manages the macrocell and the small cell #1.

Determining in step S1002 to offload the mobile station UE (to change the connection-destination small cell of the mobile station UE), the radio base station eNB determines the offload destination of the mobile station UE (the next connection-destination small cell of the mobile station UE) in step S1003.

In step S1004, the radio base station eNB transmits an "Offload Command" to the mobile station UE which commands it to change its connection-destination small cell (Scell).

Following the "Offload Command," the mobile station UE changes its connection-destination small cell from the small cell #1 to the small cell #2.

Next, one example of the operation of the radio base station eNB according to this embodiment will be described with reference to FIG. 4.

As shown in FIG. 4, in step S101, the radio base station eNB selects the small cell #1, which is congested. In step S102, based on "Measurement Reports" received from the mobile stations UE which are in a connected state in the small cell #1, the radio base station eNB selects candidate mobile stations UE whose connection destinations should be changed (candidate target mobile stations UE).

In step S103, the radio base station eNB determines for each candidate target mobile station UE whether or not it satisfies an offload condition.

If "YES," this operation proceeds to step S104. If "NO," this operation proceeds to step S105.

In step S104, the radio base station eNB offloads the mobile station UE from the small cell #1 to the small cell #2, which satisfies the offload condition.

In step S105, the radio base station eNB determines whether or not the processes in steps S103 and S104 have been performed on all the candidate target mobile stations UE mentioned above.

If "YES," this operation ends. If "NO," this operation returns to step S103.

The features of this embodiment may also be expressed as follows.

A first feature of this embodiment is summarized a radio base station eNB configured to manage a macrocell, a small cell #1 (first small cell), and a small cell #2 (second small cell), including a determination unit 12 configured to determine whether or not to change a connection destination of a mobile station UE from the small cell #1 to the small cell #2 while the mobile station UE is performing CA (carrier aggregation) by using the macrocell and the small cell #1, based on at least one of a congestion status in each of the small cell #1 and the small cell #2 and a communication quality in each of the small cell #1 and the small cell #2.

According to this feature, the radio base station eNB offloads the mobile station UE from the state where the mobile station UE is performing CA by using the macrocell and the small cell #1 to a state where the mobile station UE performs CA by using the macrocell and the small cell #2. In this way, even in a case where CA is introduced to a HetNet environment, the throughput of the mobile station UE can be improved without affecting the coverage of the macrocell.

In the first feature of this embodiment, the number of connected mobile stations UE in each of the small cell #1 and the small cell #2 may be used as the congestion status in each of the small cell #1 and the small cell #2, and the determination unit 12 may determine to change the connection destination of the mobile station UE from the small cell #1 to the small cell #2 in a case where the number of connected mobile stations UE in the small cell #1 is greater than a predetermined threshold and the number of connected mobile stations UE in the small cell #2 is less than the predetermined threshold.

According to this feature, the connection-destination small cell of the mobile station UE can be appropriately changed without affecting the coverage of the macrocell by taking into consideration the number of connected mobile stations in each of the small cells #1, #2.

In the first feature of this embodiment, the predetermined threshold may be an average of the numbers of connected mobile stations UE in a predetermined number of small cells deployed within the macrocell.

According to this feature, whether or not the small cells are congested can be appropriately determined based on the average of the numbers of connected mobile stations in the predetermined number of small cells.

In the first feature of this embodiment, the number of connected mobile stations UE in each of the small cell #1 and the small cell #2 may be used as the congestion status in each of the small cell #1 and the small cell #2, and the determination unit 12 may determine to change the connection destination of the mobile station UE from the small cell #1 to the small cell #2 in a case where the number of connected mobile stations UE in the small cell #1 is greater than the number of connected mobile stations UE in the small cell #2.

According to this feature, the connection-destination small cell of the mobile station UE can be appropriately changed without affecting the coverage of the macrocell by taking into consideration the number of connected mobile stations in each of the small cells #1, #2.

In the first feature of this embodiment, an amount of traffic in each of the small cell #1 and the small cell #2 may be used as the congestion status in each of the small cell #1 and the small cell #2, and the determination unit 12 may determine to change the connection destination of the mobile station UE from the small cell #1 to the small cell #2 in a case where the amount of traffic in the small cell #1 is greater than a predetermined threshold and the amount of traffic in the small cell #2 is less than the predetermined threshold.

In the first feature of this embodiment, an amount of traffic in each of the small cell #1 and the small cell #2 may be used as the congestion status in each of the small cell #1 and the small cell #2, and the determination unit 12 may determine to change the connection destination of the mobile station UE from the small cell #1 to the small cell #2 in a case where the amount of traffic in the small cell #1 is greater than the amount of traffic in the small cell #2 by a predetermined threshold.

According to these features, the connection-destination small cell of the mobile station UE can be appropriately changed without affecting the coverage of the macrocell by taking into consideration the amount of traffic in each of the small cells #1, #2.

In the first feature of this embodiment, the predetermined threshold may be an average of the amounts of traffic in a predetermined number of small cells deployed within the macrocell.

According to this feature, whether or not the small cells are congested can be properly determined based on the average of the amounts of traffic in the predetermined number of small cells.

In the first feature of this embodiment, the determination unit 12 may determine whether or not to change the connection destination of the mobile station UE from the small cell #1 to the small cell #2 in a case where a difference between the communication quality of the mobile station UE in the small cell #1 and the communication quality of the mobile station UE in the small cell #2 is less than or equal to a predetermined threshold.

In the first feature of this embodiment, the determination unit 12 may determine whether or not to change the connection destination of the mobile station UE from the small cell #1 to the small cell #2 in a case where the communication quality of the mobile station UE in the small cell #1 is lower than a predetermined communication quality and the communication quality of the mobile station UE in the small cell #2 is higher than the predetermined communication quality.

According to these feature, the mobile stations UE whose connection-destination small cells are to be changed can be properly selected.

In the first feature of this embodiment, any one of RSRP, RSRQ, SIR, and CQI in each of the small cell #1 and the small cell #2 may be used as the communication quality in each of the small cell #1 and the small cell #2.

According to this feature, a proper reference can be used in selecting the mobile stations UE whose connection-destination small cells are to be changed.

Here, the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB. Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-180433 (filed on Aug. 30, 2013) is incorporated by reference in the present specification.

INDUSTRIAL APPLICABILITY

As described above, the present invention can provide a radio base station capable of improving the throughput of a mobile station UE without affecting the coverage of a macrocell in a case where CA is introduced to a HetNet environment.

EXPLANATION OF THE REFERENCE NUMERALS eNB radio base station
UE mobile station
11 reception unit
12 determination unit
13 transmission unit

The invention claimed is:

1. A radio base station configured to manage a macrocell, a first small cell, and a second small cell, the radio base station comprising:
   a processor configured to determine whether or not to change a connection destination of a mobile station from the first small cell to the second small cell while the mobile station is performing carrier aggregation by using the macrocell and the first small cell, based on at least one of a congestion status in each of the first small cell and the second small cell and a communication quality in each of the first small cell and the second small cell,
   wherein
   a number of connected mobile stations in each of the first small cell and the second small cell is used as the congestion status in each of the first small cell and the second small cell,
   the processor determines to change the connection destination of the mobile station from the first small cell to the second small cell in a case where the number of connected mobile stations in the first small cell is greater than a predetermined threshold and the number of connected mobile stations in the second small cell is less than the predetermined threshold, and
   the predetermined threshold is an average of the number of connected mobile stations in a predetermined number of small cells deployed within the macrocell.

2. The radio base station according to claim 1, wherein the number of connected mobile stations in each of the first small cell and the second small cell is used as the congestion status in each of the first small cell and the second small cell, and
   the processor determines to change the connection destination of the mobile station from the first small cell to the second small cell in a case where the number of connected mobile stations in the first small cell is greater than the number of connected mobile stations in the second small cell.

3. The radio base station according to claim 1, wherein an amount of traffic in each of the first small cell and the second small cell is used as the congestion status in each of the first small cell and the second small cell, and
   the processor determines to change the connection destination of the mobile station from the first small cell to the second small cell in a case where the amount of traffic in the first small cell is greater than a predetermined threshold and the amount of traffic in the second small cell is less than the predetermined threshold.

4. The radio base station according to claim 3, wherein the predetermined threshold is an average of the amounts of traffic in a predetermined number of small cells deployed within the macrocell.

5. The radio base station according to claim 1, wherein
an amount of traffic in each of the first small cell and the second small cell is used as the congestion status in each of the first small cell and the second small cell, and
the processor determines to change the connection destination of the mobile station from the first small cell to the second small cell in a case where the amount of traffic in the first small cell is greater than the amount of traffic in the second small cell by a predetermined threshold.

6. The radio base station according to claim 5, wherein the predetermined threshold is an average of the amounts of traffic in a predetermined number of small cells deployed within the macrocell.

7. The radio base station according to claim 1, wherein the processor determines whether or not to change the connection destination of the mobile station from the first small cell to the second small cell in a case where a difference between the communication quality of the mobile station in the first small cell and the communication quality of the mobile station in the second small cell is less than or equal to a predetermined threshold.

8. The radio base station according to claim 7, wherein any one of RSRP, RSRQ, SIR, and CQI in each of the first small cell and the second small cell is used as the communication quality in each of the first small cell and the second small cell.

9. The radio base station according to claim 1, wherein the processor determines whether or not to change the connection destination of the mobile station from the first small cell to the second small cell in a case where the communication quality of the mobile station in the first small cell is lower than a predetermined communication quality and the communication quality of the mobile station in the second small cell is higher than the predetermined communication quality.

10. The radio base station according to claim 9, wherein any one of RSRP, RSRQ, SIR, and CQI in each of the first small cell and the second small cell is used as the communication quality in each of the first small cell and the second small cell.

11. A radio base station configured to manage a macrocell, a first small cell, and a second small cell, the radio base station comprising:
a processor configured to determine whether or not to change a connection destination of a mobile station from the first small cell to the second small cell while the mobile station is performing carrier aggregation by using the macrocell and the first small cell, based on at least one of a congestion status in each of the first small cell and the second small cell and a communication quality in each of the first small cell and the second small cell,
wherein
an amount of traffic in each of the first small cell and the second small cell is used as the congestion status in each of the first small cell and the second small cell,
the processor determines to change the connection destination of the mobile station from the first small cell to the second small cell in a case where the amount of traffic in the first small cell is greater than a predetermined threshold and the amount of traffic in the second small cell is less than the predetermined threshold, and
the predetermined threshold is an average of the amounts of traffic in a predetermined number of small cells deployed within the macrocell.

12. A radio base station configured to manage a macrocell, a first small cell, and a second small cell, the radio base station comprising:
a processor configured to determine whether or not to change a connection destination of a mobile station from the first small cell to the second small cell while the mobile station is performing carrier aggregation by using the macrocell and the first small cell, based on at least one of a congestion status in each of the first small cell and the second small cell and a communication quality in each of the first small cell and the second small cell,
wherein
an amount of traffic in each of the first small cell and the second small cell is used as the congestion status in each of the first small cell and the second small cell,
the processor determines to change the connection destination of the mobile station from the first small cell to the second small cell in a case where the amount of traffic in the first small cell is greater than the amount of traffic in the second small cell by a predetermined threshold, and
the predetermined threshold is an average of the amounts of traffic in a predetermined number of small cells deployed within the macrocell.

* * * * *